US00RE38128E

(19) United States

(12) Reissued Patent

Gallup et al.

(10) Patent Number: US RE38,128 E

(45) Date of Reissued Patent: Jun. 3, 2003

(54) VARIABLE TEMPERATURE SEAT CLIMATE CONTROL SYSTEM

(75) Inventors: David F. Gallup, South San Francisco, CA (US); David R. Noles, Manhattan Beach, NY (US); Richard R. Willis, San Leandro, CA (US)

(73) Assignee: Amerigon Inc., Irwindale, CA (US)

(21) Appl. No.: 09/096,226

(22) Filed: Jun. 11, 1998

Related U.S. Patent Documents

Reissue of:

(64) Patent No.: 5,524,439
Issued: Jun. 11, 1996
Appl. No.: 08/156,052
Filed: Nov. 22, 1993

U.S. Applications:
(

(62) Division of application No. 09/621,258, filed on Jul. 20, 2000, now abandoned.

(51) Int. Cl.[7] ..... F25B 21/02

(52) U.S. Cl. ..... 62/3.5; 62/3.61; 62/261

(58) Field of Search ..... 62/3.5, 3.6, 3.61, 62/261, 3.3; 236/49.3

(56) References Cited

U.S. PATENT DOCUMENTS

| | | | | |
|---|---|---|---|---|
| 1,541,213 A | | 6/1925 | Harley | |
| 2,782,834 A | | 2/1957 | Vigo | |
| 2,826,135 A | | 3/1958 | Benzick | |
| 2,912,832 A | | 11/1959 | Clark | |
| 2,978,972 A | | 4/1961 | Hake | |
| 2,992,604 A | | 7/1961 | Trotman et al. | |
| 3,030,145 A | | 4/1962 | Kottemann | |
| 3,136,577 A | | 6/1964 | Richard | 297/180 |
| 3,137,523 A | | 6/1964 | Karner | |
| 3,550,523 A | * | 12/1970 | Segal | 62/261 |
| 3,552,133 A | | 1/1971 | Lukomsky | 62/3.3 |
| 3,653,589 A | | 4/1972 | McGrath | 236/49.3 |
| 3,653,590 A | | 4/1972 | Elsea | 236/49.3 |
| 3,684,170 A | | 8/1972 | Roof | |
| 4,065,936 A | | 1/1978 | Fenton et al. | 236/49.3 |
| 4,665,707 A | | 5/1987 | Hamilton | 62/3.3 |
| 4,777,802 A | | 10/1988 | Feher | 62/3.3 |
| 4,905,475 A | | 3/1990 | Tuomi | 62/3.3 |
| 4,923,248 A | | 5/1990 | Feher | 62/3.3 |
| 5,002,336 A | | 3/1991 | Feher | 297/180 |
| 5,117,638 A | | 6/1992 | Feher | 62/3.2 |
| 5,226,188 A | | 7/1993 | Liou | |

FOREIGN PATENT DOCUMENTS

JP 5-277020 10/1993

OTHER PUBLICATIONS

Publication, Abstract *Thermoelectric Air Conditioned Variable Temperature Seat (VTS) & Effect Upon Vehicle Occupant Comfort, Vehicle Energy Efficiency, and Vehicle Environment Compatability.*

* cited by examiner

*Primary Examiner*—William E. Tapolcai

(74) *Attorney, Agent, or Firm*—Knobbe, Martens, Olson & Bear LLP

(57) ABSTRACT

A temperature climate control system comprises a variable temperature seat, at least one heat pump, at least one heat pump temperature sensor, and a controller. Each heat pump comprises a number of Peltier thermoelectric modules for temperature conditioning the air in a main heat exchanger and a main exchanger fan for passing the conditioned air from the main exchanger to the variable temperature seat. The Peltier modules and each main fan may be manually adjusted via a temperature switch and a fan switch, respectively. Additionally, the temperature climate control system may comprise a number of additional temperature sensors to monitor the temperature of the ambient air surrounding the occupant as well as the temperature of the conditioned air directed to the occupant. The controller is configured to automatically regulate the operation of the Peltier modules and/or each main fan according to a temperature climate control algorithm designed both to maximize occupant comfort during normal operation, and minimize possible equipment damage, occupant discomfort, or occupant injury in the event of a heat pump malfunction.

25 Claims, 8 Drawing Sheets

12
20
18
16
24
10
14
17
20
20
22
18
20

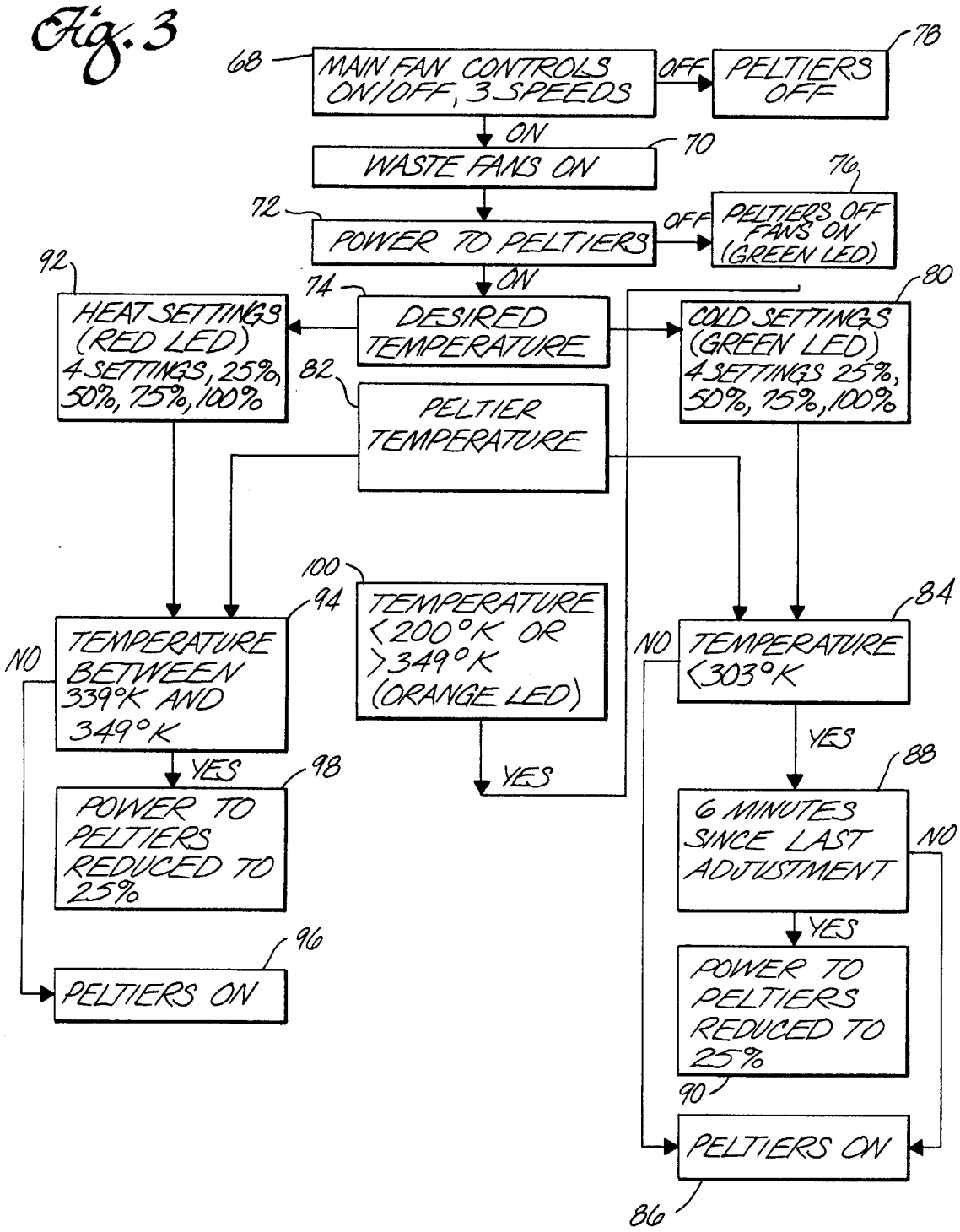
Fig. 3
68
MAIN FAN CONTROLS ON/OFF, 3 SPEEDS
OFF
PELTIERS OFF
78
ON
WASTE FANS ON
70
76
72
POWER TO PELTIERS
OFF
PELTIERS OFF FANS ON (GREEN LED)
ON
92
74
80
HEAT SETTINGS (RED LED) 4 SETTINGS, 25%, 50%, 75%, 100%
DESIRED TEMPERATURE
COLD SETTINGS (GREEN LED) 4 SETTINGS 25%, 50%, 75%, 100%
82
PELTIER TEMPERATURE
100
94
TEMPERATURE <200°K OR >349°K (ORANGE LED)
84
NO
TEMPERATURE BETWEEN 339°K AND 349°K
NO
TEMPERATURE <303°K
YES
YES
YES
98
88
POWER TO PELTIERS REDUCED TO 25%
6 MINUTES SINCE LAST ADJUSTMENT
NO
YES
96
PELTIERS ON
POWER TO PELTIERS REDUCED TO 25%
90
PELTIERS ON
86

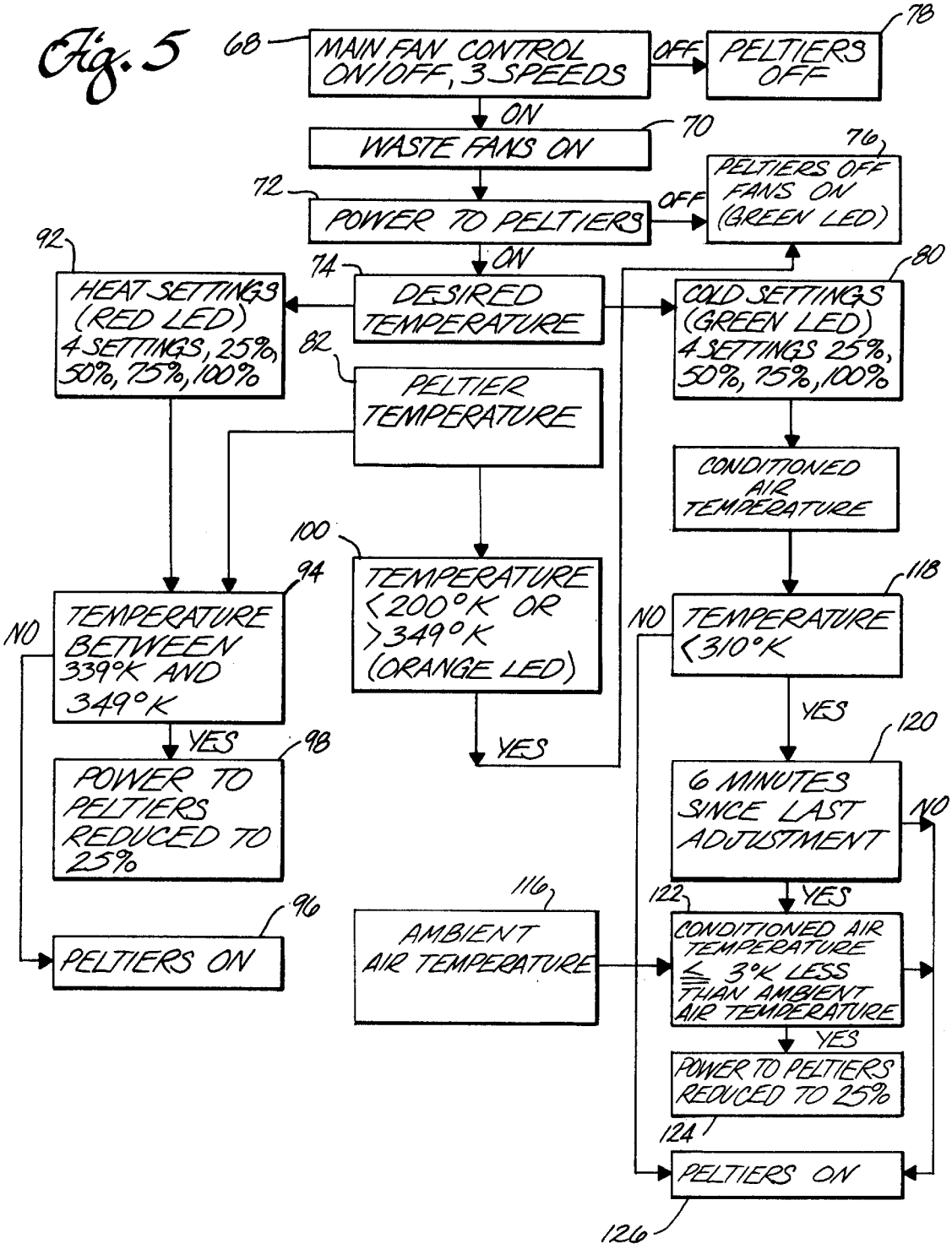
Fig. 5
68
MAIN FAN CONTROL ON/OFF, 3 SPEEDS
OFF
PELTIERS OFF
78
ON
WASTE FANS ON
70
76
PELTIERS OFF FANS ON (GREEN LED)
72
POWER TO PELTIERS
OFF
ON
92
74
DESIRED TEMPERATURE
80
HEAT SETTINGS (RED LED) 4 SETTINGS, 25%, 50%, 75%, 100%
COLD SETTINGS (GREEN LED) 4 SETTINGS 25%, 50%, 75%, 100%
82
PELTIER TEMPERATURE
CONDITIONED AIR TEMPERATURE
100
94
TEMPERATURE <200°K OR >349°K (ORANGE LED)
118
NO
TEMPERATURE BETWEEN 339°K AND 349°K
NO
TEMPERATURE <310°K
YES
YES
YES
120
98
POWER TO PELTIERS REDUCED TO 25%
6 MINUTES SINCE LAST ADJUSTMENT
NO
116
YES
96
122
PELTIERS ON
AMBIENT AIR TEMPERATURE
CONDITIONED AIR TEMPERATURE ≤ 3°K LESS THAN AMBIENT AIR TEMPERATURE
YES
POWER TO PELTIERS REDUCED TO 25%
124
PELTIERS ON
126

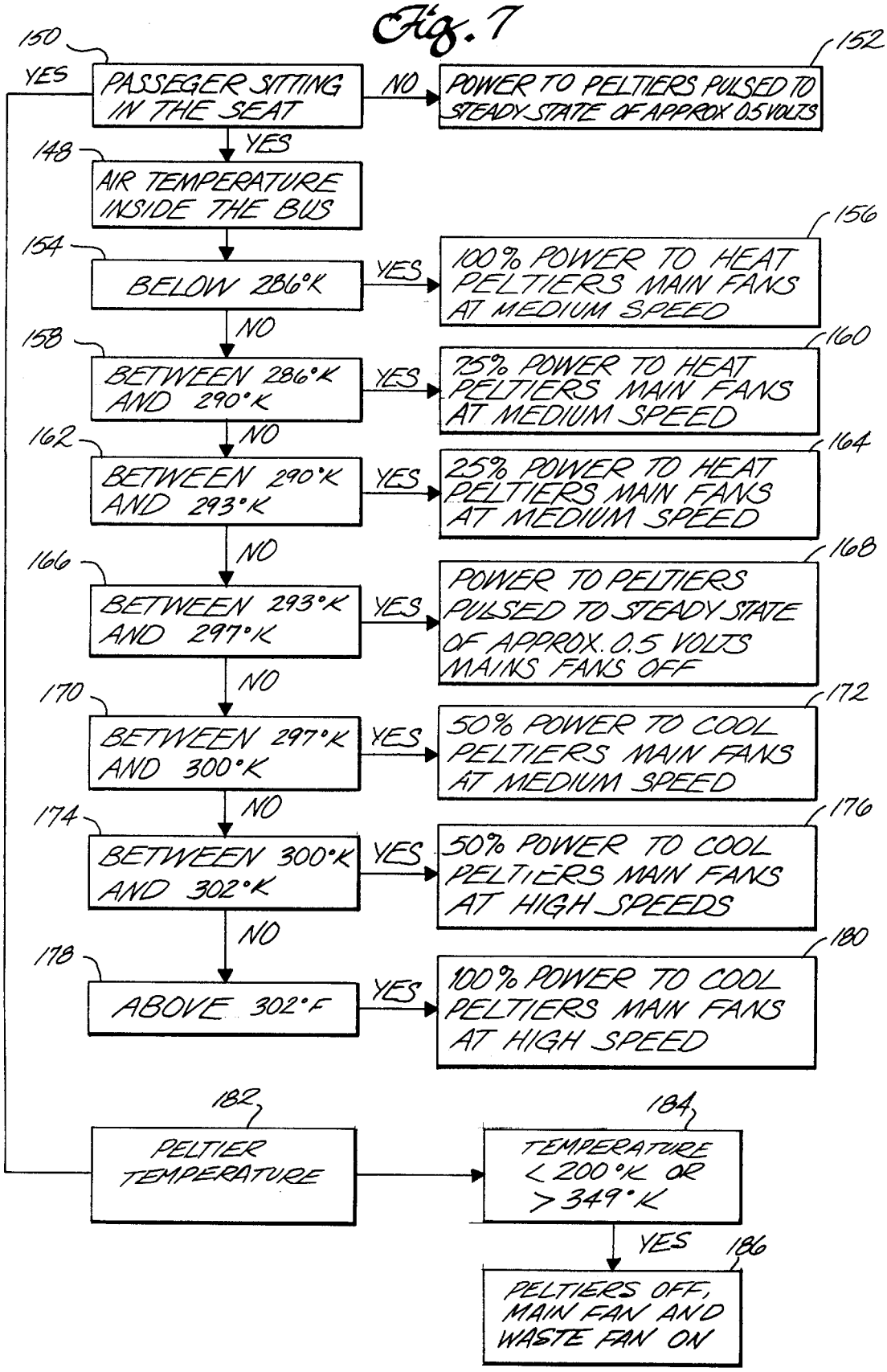
Fig. 7
150
PASSEGER SITTING IN THE SEAT
YES
NO
152
POWER TO PELTIERS PULSED TO STEADY STATE OF APPROX 0.5 VOLTS
148
AIR TEMPERATURE INSIDE THE BUS
154
BELOW 286°K
YES
156
100% POWER TO HEAT PELTIERS MAIN FANS AT MEDIUM SPEED
NO
158
BETWEEN 286°K AND 290°K
YES
160
75% POWER TO HEAT PELTIERS MAIN FANS AT MEDIUM SPEED
NO
162
BETWEEN 290°K AND 293°K
YES
164
25% POWER TO HEAT PELTIERS MAIN FANS AT MEDIUM SPEED
NO
166
BETWEEN 293°K AND 297°K
YES
168
POWER TO PELTIERS PULSED TO STEADY STATE OF APPROX. 0.5 VOLTS MAINS FANS OFF
NO
170
BETWEEN 297°K AND 300°K
YES
172
50% POWER TO COOL PELTIERS MAIN FANS AT MEDIUM SPEED
NO
174
BETWEEN 300°K AND 302°K
YES
176
50% POWER TO COOL PELTIERS MAIN FANS AT HIGH SPEEDS
NO
178
ABOVE 302°F
YES
180
100% POWER TO COOL PELTIERS MAIN FANS AT HIGH SPEED
182
PELTIER TEMPERATURE
184
TEMPERATURE < 200°K OR > 349°K
YES
186
PELTIERS OFF, MAIN FAN AND WASTE FAN ON

VARIABLE TEMPERATURE SEAT CLIMATE CONTROL SYSTEM

Matter enclosed in heavy brackets [ ] appears in the original patent but forms no part of this reissue specification; matter printed in italics indicates the additions made by reissue.

*Application Ser. No. 09/621,258 was filed Jul. 20, 2000 as a continuation of the present case, and is now abandoned.*

FIELD OF THE INVENTION

The present invention relates generally to a variable temperature seat and, more specifically, to a method and apparatus for controlling the flow and temperature of a heating or cooling medium through the seat to an occupant positioned in such seat.

BACKGROUND OF THE INVENTION

Cooling or heating occupants of buildings, homes, automobiles and the like is generally carried out by convection through modifying the temperature of air surrounding the occupants environment. The effectiveness of convection heating or cooling is largely dependent on the ability of the temperature conditioned air to contact and surround all portions of the occupants's body. Heating and cooling occupants through convention is generally thought to be efficient in such applications as homes, offices, and other like structures where the occupants are not stationary or fixed in one position but, rather are moving around allowing maximum contact with the temperature treated air.

In other applications such as automobiles, planes, buses and the like, the occupants are typically fixed in one position with a large portion of their body's surface against the surface of a seat, isolated from effects of the temperature conditioned air. In such applications the use of distributing temperature conditioned air into the cabin of the vehicle to heat or cool the occupant is less effective due to the somewhat limited surface area of contact with the occupant's body. In addition, oftentimes the surface of the seat is at a temperature close to the ambient temperature upon initial contact by the occupant, increasing the need to provide rapid temperature compensation to the occupant in an effective manner.

To address the problem of providing effective occupant heating or cooling in such applications, seats have been constructed to accommodate the internal flow of a heating or cooling medium and to distribute the same through the seating surface to the surface of the occupant in contact with the seat. A preferred heating and cooling medium is air. A seat constructed in this manner increases the efficiency of heating or cooling a passenger by convection by distributing temperature conditioned air directly to the surface the occupant generally isolated from contact with temperature conditioned air that is distributed throughout the cabin of the vehicle.

U.S. Pat. No. 4,923,248 issued to Feher discloses a seat pad and backrest comprising an internal plenum for distributing temperature conditioned air from a Peltier thermoelectric module through the surface of the seat pad and to an adjacent surface of an occupant. The temperature conditioned air is provided by using a fan to blow ambient air over the fins of a Peltier module. The heating or cooling of the occupant is achieved by changing the polarity of the electricity that powers the Peltier module.

U.S. Pat. No. 5,002,336 issued to Feher discloses a joined seat and backrest construction comprising an internal plenum for receiving and distributing temperature conditioned air through the seat and to an adjacent surface of an occupant. Like U.S. Pat. No. 4,923,248, the temperature conditioned air is provided by a Peltier thermoelectric module and distributed through the internal plenum by an electric fan.

U.S. Pat. No. 5,117,638 issued to Feher discloses a selectively cooled or heated seat construction and apparatus for providing temperature conditioned air. The seat construction comprising, an internal plenum, a plastic mash layer, a metal mesh layer, and perforated outer layer. The apparatus for providing the temperature conditioned air is heat exchanger comprising a Peltier thermoelectric module and a fan. Heating or cooling the occupant is achieved by switching the polarity of the electricity powering the Peltier module.

The seat constructions known in the art, although addressing the need to provide a more efficient method of heating or cooling the occupant, has not addressed the need to provide temperature conditioned air to an occupant in a manner that both maximizes occupant comfort and maximizes power efficiency.

The ever increasing awareness of our environment and the need to conserve resources has driven the need to replace hydrocarbon powered vehicles, such as the automobile, with vehicles that are powered by an environmentally friendly power sources such as electricity. The replacement of current hydrocarbon automobiles with electric powered vehicles will only become a reality if the electric powered vehicle can be operated and maintained in a manner equaling or bettering that of the hydrocarbon powered automobile it replaces. Accordingly, the need for electric vehicles to perform in an electrically efficient manner, is important to the success of the electric vehicle.

In order to maximize the electrical efficiency of the electric powered vehicle it is necessary that the electrically powered ancillary components of the electric vehicle function at maximum electrical efficiency. The seats known in the art that provide temperature conditioned air to an occupant do not operate in an electrically efficient manner. The temperature of the air being conditioned by the Peltier thermoelectric devices in such seats is adjusted by dissipating the excess power through a resister, i.e., by using a potentiometer. The practice of dissipating excess power instead of providing only that amount of power necessary to operate the Peltier thermoelectric devices makes such seats unsuited for such power sensitive applications as the electric vehicle as well as other applications where electrical efficiency is a concern.

The seats known in the art constructed to provided temperature conditioned air to an occupant are adjustable in that the occupant may either choose to produce heated air or cooled air. However, the seats known in the art are unable to automatically regulate the temperature or flow rate of the cool or heated air distributed to the occupant in the event that the thermoelectric device malfunctions or in the event that the user falls asleep. An electrical malfunctioning of the thermoelectric device could result in the abnormal heating of the device, causing damage to the thermoelectric device itself. An electrical malfunction could result in the distribution of hot air to the occupant, causing discomfort or even injury. Additionally, an initial temperature setting of maximum heat or maximum cold that is left untouched in the event the occupant falls asleep may cause damage to the thermoelectric device itself or may cause discomfort or even injury to the occupant.

The seats known in the art, while able to vary the distribution of air to the seat bottom or seat back via occupant adjustment, do not allow the occupant to vary the temperature of the air passing through the seat back or seat bottom, independently. The option of being able to selectively heat one portion of the seat and cool the other may be desirable where the occupant requires such selective treatment due to a particular medical condition or injury. For example, one a cold day it would be desirable to distribute heated air to the seat back for occupant comfort and cooled air to the seat bottom to assist in healing a leg injury that has recently occurred.

It is, therefore, desirable that a variable temperature seat comprise a control system and method for regulating the temperature and flow rate of temperature conditioned air to an occupant sitting in the seat. It is desirable that the control system operate the seat in an electrically efficient manner, making it ideal for use in power sensitive applications such as the electric powered vehicle. It is desirable that the control system operate the seat in a manner eliminating the possibility of equipment damage, occupant discomfort or injury. It is also desirable that the control system permit the independent distribution of heated or cooled air to the seat back or seat bottom.

SUMMARY OF THE INVENTION

There is, therefore, provided in practice of this invention a temperature climate control system for use with a variable temperature seat. The temperature climate control system comprises a variable temperature seat suitable for distributing temperature conditioned air to a seated occupant, at least one heat pump for temperature conditioning ambient air and passing the air to the seat, a temperature sensor located at each heat pump, and a controller configured to monitor the temperature of the heat pumps and regulate their operation according to a temperature climate control algorithm.

Each heat pump comprises a number of Peltier thermoelectric modules for selectively heating or cooling ambient air in a main heat exchanger. The heated or cooled air is passed to the seat by a main exchanger fan. Each heat pump also comprises a waste heat exchanger for removing unwanted heat or cooling from the Peltier modules. The unwanted heat or cooling is passed to the outside environment by a waste exchanger fan.

Each main fan may be manually adjusted to operate at a variety of predetermined speeds via a fan switch. Each Peltier module can be manually adjusted to operate in various heating or cooling modes via a temperature switch. The electrical power to each Peltier is pulsed at a duty cycle corresponding to a particular heating or cooling mode of operation to optimize electrical efficiency. Each heat pump may be operated independently via separate fan and temperature switches, or may be operated simultaneously by a common fan and temperature switch. Alternatively, each heat pump may be operated automatically by the controller when the variable temperature seat is occupied by the activation of an occupant presence switch.

After an initial fan speed and Peltier temperature setting has been selected, the controller monitors the temperature information relayed from each heat pump. In addition, the controller may also be configured to monitor the ambient temperature of the air surrounding the variable temperature seat occupant as well as the temperature of the conditioned air directed to the variable temperature seat occupant, via the use of additional temperature sensors. The controller regulates the operation of each main exchanger fan, each waste exchanger fan, and each Peltier module according to a temperature climate control algorithm. The control algorithm is designed to maximize occupant comfort and minimize the possibility of equipment damage, occupant discomfort or even occupant injury in the event of a system malfunction.

The control algorithm is designed to interrupt or limit the power to the Peltier modules and/or each main exchanger fan in the event that the heat pump temperature exceeds a predetermined maximum temperature or a predetermined minimum temperature, indicating a possible heat pump malfunction. Additionally, the control algorithm is designed to interrupt power to the Peltier modules in the event that the temperature of the conditioned air directed to the variable temperature seat occupant exceeds a predetermined maximum or minimum temperature.

The control algorithm is also designed to limit the power to the Peltier modules during the cooling mode of operation when the temperature of the cooling air directed to the occupant exceeds a predetermined minimum cooling temperature and the temperature has not been adjusted for a predetermined period of time, thus minimizing possible occupant discomfort associated with overcooling the occupant's back. In addition, the control algorithm is designed to limit the power to the Peltier modules during the cooling mode of operation when the temperature difference between the ambient air surrounding the variable temperature seat occupant and the conditioned air directed to the occupant is greater than a predetermined amount.

BRIEF DESCRIPTION OF THE DRAWINGS

These and other features and advantages of the present invention will become appreciated as the same becomes better understood with reference to the specification, claims and drawings wherein:

FIG. 3 is a flow chart illustrating a temperature climate control algorithm for the embodiment of the invention shown in FIG. 2;

FIG. 5 is a flow chart illustrating a temperature climate control algorithm for the embodiment of the invention shown in FIG. 4;

FIG. 7 is a flow chart illustrating a temperature climate control algorithm for the embodiment of the invention shown in FIG. 6.

DETAILED DESCRIPTION

A temperature climate control system (TCCS) provided in the practice of this invention may be used to control the temperature of air being distributed through a variable temperature seat (VTS) and directed to a seated occupant.

The TCCS may be used in various VTS applications where it is required that an occupant stay seated for a period of time, such as automobiles, trains, planes, buses, dentists chairs, hair styling chairs and the like, or where an occupant simply desires an added degree of comfort while he/she is sitting at work or in the home, such as office chairs, home recliners and the like. The TCCS configured according to the practice of this invention to operate in a manner providing an occupant seated in a VTS a maximum degree of comfort by allowing the occupant to manually adjust both the flow rate and the temperature of the air being passed through the seat surface and directed to the occupant.

The TCCS is configured to automatically override the manual flow rate and temperature settings when it senses that the temperature of the air being directed to the occupant is above a predetermined maximum temperature set point or is below a predetermined minimum temperature set point. Thus, maximizing both occupant comfort and occupant safety in the event that the occupant either falls asleep or in the event that the device generating the temperature conditioned air malfunctions. The TCCS also comprises timers and is configured to automatically override the manual flow rate and temperature settings during normal operation to prevent back discomfort. Additionally, the device generating the temperature conditioned air is operated in a manner maximizing electrical efficiency, making it well suited for use in applications that are sensitive to electrical consumption, such as electric powered vehicles.

Figure 1:
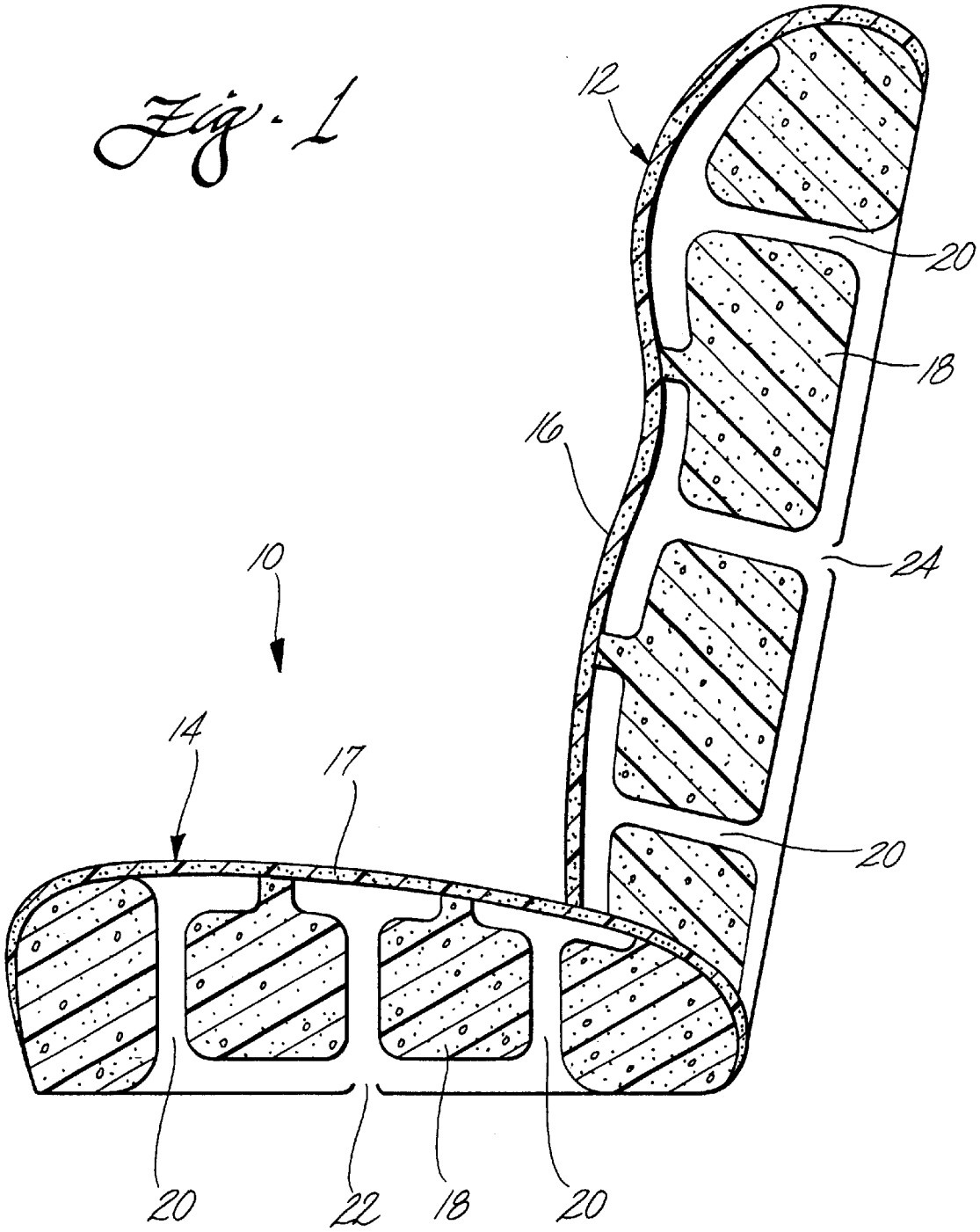
FIG. 1 is a cross-sectional semi-schematic view of an embodiment of a variable temperature seat.

FIG. 1 shows an embodiment of a VTS 10 comprising a seat back 12 and a seat bottom 14 for accommodating the support of a human occupant in the sitting position. FIG. 1 shows a simplified cross-sectional view of a VTS for purposes of illustration and clarity. Accordingly, it is to be understood that the VTS may be constructed in embodiments other than that specifically represented. The VTS may be constructed having a outside surface covering 16 made from a suitable material that allows the flow of air through its surface, such as perforated vinyl, cloth, leather or the like. A padding layer 17 such as reticulated foam may lie beneath the outside surface 16 to increase occupant comfort.

The VTS may be constructed having a metal frame (not shown) that generally defines the seat configuration and having seat bottom and seat back cushions 18 made from foam and the like. A number of air channels 20 are positioned within each seat cushion and extend from the padding layer 17 through the seat cushions and to either a seat bottom air inlet 22 or a seat back air inlet 24. Although a particular embodiment of a VTS has specifically described, it has to be understood that the TCCS according to the present invention is meant to operate with any type of VTS having the same general features.

Figure 2:
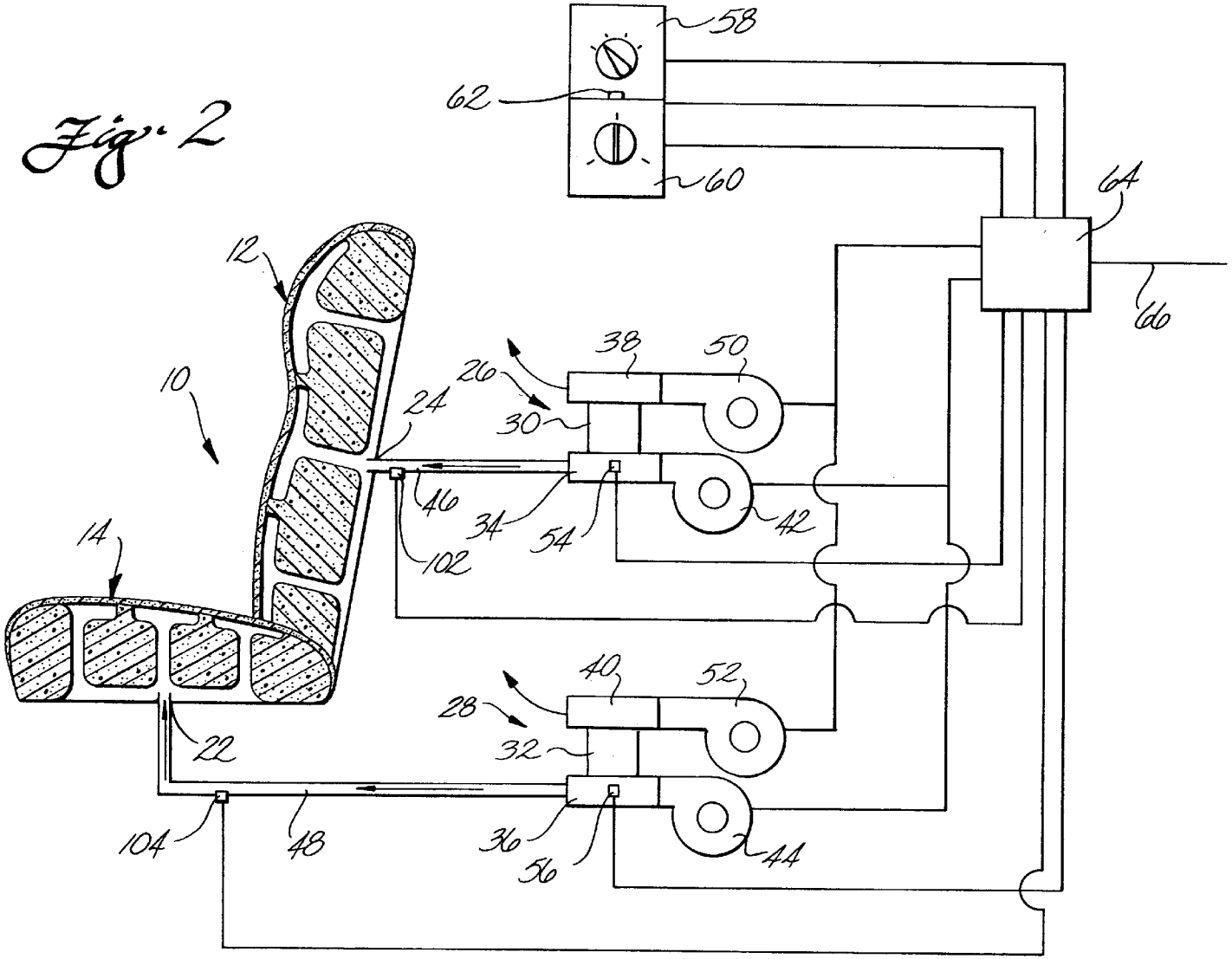
FIG. 2 is a schematic view of a first embodiment of the temperature climate control system according to the present invention.

FIG. 2 shows a first embodiment of the TCCS according to the present invention comprising a VTS 10. The air that is passed through the seat and to the occupant is temperature conditioned by a heat pump. This first embodiment comprises a seat back heat pump 26 for temperature conditioning the air passed through the seat back 12 of the VTS, and a seat bottom heat pump 28 for temperature conditioning the air passed through the seat bottom 14 of the VTS. The seat back heat pump and seat bottom heat pump each comprise at least one thermoelectric device 30 and 32, respectively, for temperature conditioning, i.e., selectively heating or cooling, the air. A preferred thermoelectric device is a Peltier thermoelectric module. Each heat pump may comprise more than one Peltier thermoelectric module. A preferred heat pump comprises approximately three Peltier thermoelectric modules.

Each heat pump comprises a main heat exchanger 34 and 36, enclosing air temperature conditioning fins (not shown) depending from one surface of the Peltier modules, and a waste heat exchanger 39 and 40, enclosing thermal exchanger fins (not shown) extending from the Peltier module surface opposite the main heat exchanger. Attached to one end of each main heat exchanger is an outlet from a main exchanger fan 42 and 44 that serves to pass the temperature conditioned air in each main heat exchanger to the seat back or seat bottom, respectively. Each main exchanger fan may comprise an electrical fan having a suitable flow rate, such as an axial blower and the like. The outlet end of each main heat exchanger is connected to an air conduit 46 and 48 that is connected to the respective seat back air inlet 24 or seat bottom air inlet 22. Accordingly, the temperature conditioned air produced by the Peltier thermoelectric modules in each main heat exchanger is passed through the respective air conduit, through the respective air inlet, into and through the respective seat portion of the VTS to the occupant by the main exchanger fan.

Attached to one end of each waste heat exchanger is an outlet from a waste exchanger fan 50 and 52 that serves to pass unwanted waste heat or cooling produced in each waste heat exchanger to the outside environment surrounding the VTS. Each waste exchanger fan may comprise an electrical fan having a suitable air flow rate, such as an axial blower and the like. The waste air exiting each waste heat exchanger fan is usually at an undesirable temperature, i.e., in the cooling mode it is hot air and in the heating mode it is cold air. Consequently, waste air exiting each waste exchanger may be specifically routed away from any occupant, possibly through the sides of the seat or the like.

Attached to the main exchanger side of the Peltier thermoelectric modules in each heat pump is a temperature sensor 54 and 56. Each temperature sensor may comprise an electric thermocouple and the like.

The operation of the main exchanger fans 42 and 44 can be manually controlled by a fan switch 58. In the first embodiment, it is preferred that the main exchanger fans are operated simultaneously by a single fan switch. The fan switch may comprise an electrical switch configured to provide an off position, and a variety of fan speed settings if desired. It is preferred that the fan switch be configured having an off position and three different fan speed settings, namely low, medium and high. The fan switch may be located within or near the VTS for easy occupant access.

The operation of the waste exchanger fans 50 and 52 can be manually controlled by a separate fan switch (not shown) if desired. However, it is preferred that the waste exchanger fans be activated automatically upon the operation of the main exchanger fans and operate at a single predetermined speed. Accordingly, upon the manual operation of the fan switch 58, both the main exchanger fans are activated to a selected speed and the waste exchanger fans are automatically activated to operate at maximum speed. Configuring the TCCS to operate in this manner maximizes the thermal efficiency of the Peltier modules and reduces the possibility of system damage.

The operation of the Pelter thermoelectric modules can be controlled by a temperature switch 60. In the first embodiment it is preferred that the Peltier thermoelectric modules in both heat pumps be operated simultaneously by a single temperature switch. The temperature switch may comprise an electrical switch configured to provide an off position, and a variety of temperature settings if desired. A preferred fan switch is configured having an off position, four heating positions, and four cooling positions. Like the fan switch 58, the temperature switch 60 may be located within or near the VTS for easy occupant access.

When the temperature switch is turned to one of the cooling positions a LED lamp 62 located near the temperature switch registers a green color, indicating that the Peltier modules are operating in the cooling mode. When the temperature switch is turned to one of the heating positions the LED lamp registers a red color, indicating the Peltier modules are operating in the heating mode.

The different heating or cooling modes for the Peltier modules is accomplished by both switching the polarity and limiting the amount of the electrical power routed to the Peltier modules. To optimize the electrical efficiency of the Peltier modules, instead of using a potentiometer to discharge the unwanted portion of the electrical power through a resister, the four different modes of heating and cooling operation are achieved by pulsing electrical power to the Peltier modules at predetermined duty cycles. Accordingly, the different levels of heating or cooling are accomplished by pulsing the electrical power to the Peltier modules at a predetermined duty cycle. In a preferred embodiment, the duty cycle is about 0.02 seconds (50 hz) and the four different levels are accomplished by applying either 25 percent, 50 percent, 75 percent, or 100 percent of the cycle time power. In this embodiment, a 25 percent duty cycle would be on for approximately 0.005 seconds and off for approximately 0.015 seconds for a total cycle length of 0.02 seconds, and then repeated. The 75 percent duty cycle is on for approximately 0.015 seconds and off for approximately 0.005 seconds.

The heating or cooling mode of the Peltier modules is achieved by switching the polarity of the electrical power. The Peltier modules are configured to operate in the heating mode on approximately ten volts DC and in the cooling mode on approximately six volts DC. A DC converter may be positioned outside the controls to supply the heating and cooling voltage. The total duty cycle of the Peltier modules is adjustable from 0.02 to 0.2 seconds. The power for the Peltier modules in each mode was chosen to optimize the efficiency and total thermal power supplied to an occupant of the VTS.

The electrical feeds to and/or outlets from the fan switch 58, temperature switch 60, main exchanger fans 42 and 44, waste exchanger fans 50 and 52, Peltier thermoelectric modules 30 and 32 LED lamp 62, and temperature sensors 54 and 56 and routed to a controller 64. Alternatively, the electrical feeds ad signals may first be routed to a printed circuit board in the seat (not shown) that sends a signal to the controller. The controller comprises a power inlet 66 of sufficient electrical capacity to operate all of the aforementioned devices. The controller is configured to receive occupant inputs from the fan switch and the temperature switch and temperature information from the temperature sensors. From this input the controller is configured to make adjustments to the operation of the heat pumps according to a predetermined algorithm designed to ensure occupant comfort and safety, and protect against system damage.

FIG. 3 is a flow chart illustrating a temperature climate control algorithm for the first embodiment of the TCCS shown in FIG. 2. The occupant wishing to use the VTS operates the main exchanger fans by activating the fan switch 58 and selecting a desired fan speed (step 68). Upon the activation of the main exchanger fans the waste exchanger fans are also activated to operate at a maximum speed (step 70).

The occupant may activate the Peltier modules for temperature conditioning the air in the VTS by positioning the temperatures witch 60 to a desired heating or cooling mode (steps 72 and 74). The Peltier modules can be manually deactivated by selecting the "off" position on the temperature control switch, in which case the power to the fans is maintained as indicated by the LED 62 registering a green color (step 76). Additionally, the Peltier modules are automatically deactivated by the controller when the fan switch is manually placed in the "off" position (step 78).

When the temperature switch is positioned to one of the four cooling modes the LED lamp 62 registers a green color (step 80). The temperature detected by the temperature sensors 54 and 56 in both heat pumps 26 and 28 is passed to the controller (step 82). If the temperature is below about 303° K. (step 84) the power to the Peltier modules remains on (step 86), unless more than six minutes has elapsed since the time that the occupant has last adjusted the temperature (step 88), in which case the power to the Peltier modules is reduced to 25 percent (step 90). It is desirable to reduce the power to the Peltier modules under such circumstances to prevent over cooling of the occupant's back, which has been shown to cause the occupant discomfort after use of the VTS. If the temperature is not below 303° K., however, the power to the Peltier modules is maintained as indicated by the occupant controls (step 86).

When the temperature switch is positioned to one of the four heating modes the LED lamp 62 registers a red color (step 92). If the temperature is below about 339° K. (step 94) the power to the Peltier modules remains on (step 96). If the temperature is in the range of from 339° K. to 349° K. (step 92) the power to the Peltier modules is reduced to 25 percent until the temperature is below 339° K. (step 98). Reducing the power to the Peltier modules in this situation is desired to prevent the Peltier modules from overheating.

If the temperature of the main heat exchanger side of the Peltier modules is below either below 200° K. or above 349° K. (step 100), regardless of whether the Peltier modules are in the heating or cooling mode, the controller deactivates the Peltier modules (step 76) and maintains the operation of the main exchanger fans and waste exchanger fans. The occurrence of either of the above temperature conditions indicates a system malfunction. In this condition the LED lamp 62 registers a orange color, indicating a system malfunction.

The first embodiment comprises conditioned air temperature sensors 102 and 104 positioned in the air flow of the temperature conditioned air passing to the seat, back and seat bottom, respectively, as shown in FIG. 2. The conditioned air temperature sensors are electrically connected to the controller 64. The temperature climate control algorithm described above and illustrated in FIG. 3 is configured to deactivate the Peltier modules in the event that the temperature of the conditioned air is greater than about 325° K. or below about 297° K. While the Peltier modules are deactivated the main exchanger fans continue to run.

Figure 4:
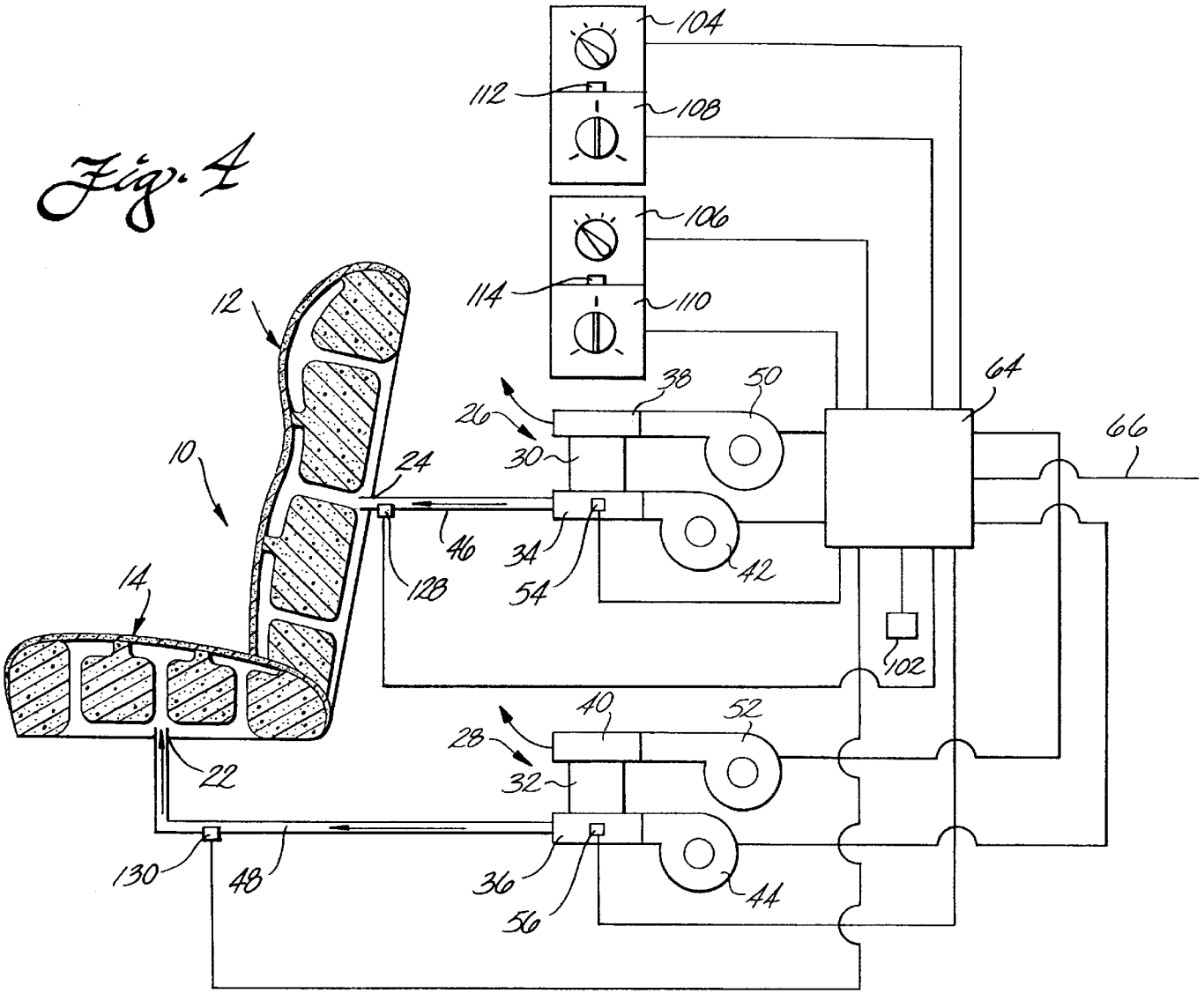
FIG. 4 is a schematic view of a second embodiment of the temperature climate control system according to the present invention.

FIG. 4 shows a second embodiment of the TCCS according to the practice of the present invention. The second embodiment is similar to the first embodiment in all respects, except for the addition of at least one ambient air temperature sensor 102 to monitor the temperature of the air outside of the VTS surrounding the occupant. The temperature sensor is electrically connected to relay ambient air temperature information to the controller 64. More than one ambient air temperature sensor may be used, each being positioned at different locations in the environment surrounding the occupant, to provide an ambient air temperature profile to the controller.

The second embodiment of the TCCS also differs from the first preferred embodiment in that the fan speed and air temperature for the seat back heat pump 26 and the seat bottom heat pump 28 can each be manually adjusted independently by using a separate seat back fan switch 104 and seat bottom fan switch 106, and a separate seat back temperature switch 108 and seat bottom temperature switch 110. The fan switches 104 and 106 and the temperature switches 108 and 110 in the second embodiment are the same as those previously described in the first embodiment. Alternatively, the TCCS may be configured having a single fan switch (not shown) to control the speed of fans 42 and 44 and two temperature switches (not shown) to control the power to each heap pump 26 and 28 independently. The TCCS may also be configured having a single temperature switch (not shown) to control the power of heat pumps 26 and 28 simultaneously and two fan switches to control the speed of each fan 42 and 44 independently.

LED lamps 112 and 114 are located near each temperature switch to indicate the mode of operation selected for each heat pump, e.g., in the off position the LED lamps are off, when both heat pumps are in the cooling mode the LED lamps register a green color, when both heat pumps are in the heating mode the LED lamps register a red color, when there is a temperature error or Peltier module malfunction in either heat pump the LED lamps fast cycle red and green, registering an orange color.

Configuring the manual fan speed and temperature switches in this manner allows the occupant the ability to operate the seat back 12 of the VTS at a different conditions than the seat bottom 14. This may be desirable where a medical condition or injury requires that a particular portion of the occupant's body be maintained at a temperature different from the remaining portion of the occupant, e.g., where a leg injury requires cooling air in the seat bottom of the VTS and the ambient temperature dictates that heated air pass through the seat back for maximum occupant comfort.

Like the first embodiment, the electrical feeds to and/or outlets from the fan switches 104 and 106, temperature switches 108 and 110, main exchanger fans 42 and 44, waste exchanger fans 50 and 52, Peltier thermoelectric modules 30 and 32, temperature sensors 54 and 56, LED lamps 112 and 114, and the ambient air temperature sensor 102 are routed to the controller 64.

FIG. 5 is a flow chart illustrating a temperature climate control algorithm for the second embodiment of the TCCS shown in FIG. 4. The control algorithm is similar to that previously described above and shown in FIG. 3, except for the additional temperature inputs from the ambient temperature sensor (step 116) and the conditioned air sensor, and except when the Peltier modules are being operated in the cooling mode and the temperature of the conditioned air from the seat back heat pump 26 is below about 310° K. (step 119). When the conditioned air temperature is below about 310° K., if it has been greater than six minutes since the last temperature adjustment by the occupant (step 120), and the conditioned air temperature of the conditioned is approximately 3° K. or more below the temperature of the ambient air surrounding the occupant (step 122) , the controller reduces the power to the Peltier modules in the seat back heat pump 26 to approximately 25 percent (step 124). If the temperature is below about 310° K., but it has either been less than six minutes since the last manual temperature adjustment or the conditioned air temperature is less than 3° K. below the ambient temperature, the power to the Peltier modules in the seat back heat pump remains on at the occupant controlled setting (step 126).

Like the control algorithm described in FIG. 3, the reason for reducing the power to the Peltier modules under such conditions is to regulate the amount of cooling air directed to an occupant's back to prevent possible discomfort after using the VTS.

The second embodiment also comprises conditioned air temperature sensors 128 and 130 positioned in the air flow of the temperature conditioned air passing to the seat, back and bottom, respectively, as shown in FIG. 4. The conditioned air temperature sensors are electrically connected to the controller 64. The temperature climate control algorithm described above and illustrated in FIG. 5 is configured to deactivate the Peltier modules in the event that the temperature of the conditioned air directed to the occupant is greater than about 325° K. or below about 297° K. While the Peltier modules are deactivated the main exchanger fans continue to run.

Figure 6:
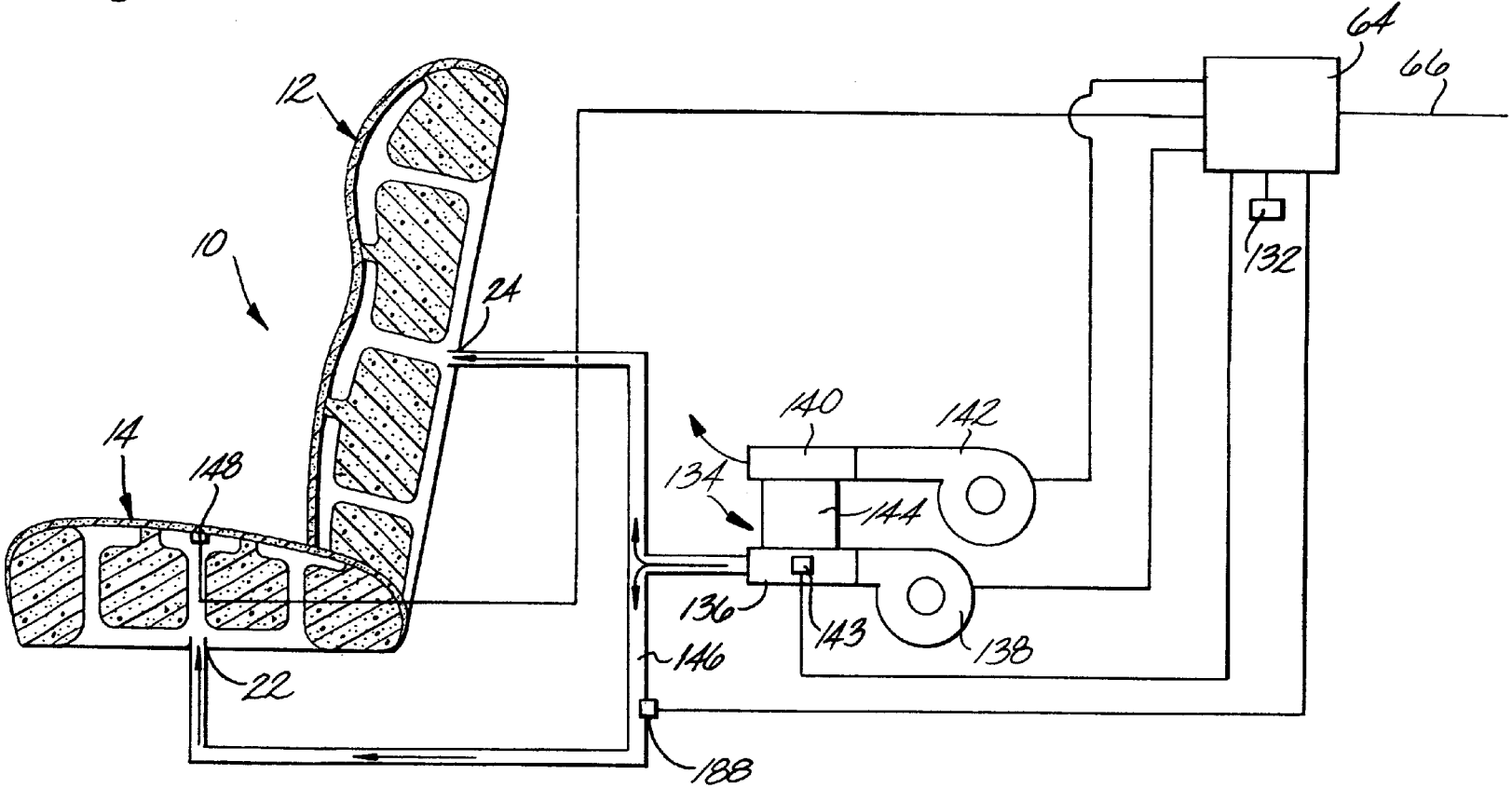
FIG. 6 is a schematic view of a third embodiment of the temperature control climate control system according to the present invention.

FIG. 6 shows a third embodiment of the TCCS according to the practice of this invention. The third embodiment is similar to the first embodiment in all respects except for two. One is the addition of at least one ambient air temperature sensor 132 to monitor the temperature of the air outside of the VTS surrounding the occupant. The temperature sensor is electrically connected to feed temperature information to the controller 64. More than one ambient air temperature sensor may be used, each being positioned at different locations in the environment surrounding the occupant, to provide an ambient air temperature profile to the controller.

The second difference in the third embodiment of the TCCS is that only a single heat pump 134 is used to provide temperature conditioned air to both the seat back 12 and the seat bottom 14. The single heat pump is similar to the seat back heat pump 26 and seat bottom heat pump 28 previously described in the first embodiment in that it comprises a main heat exchanger 136, a main exchanger fan 138, a waste heat exchanger 140, a waste exchanger fan 142 and a Peltier module temperature sensor 143. However, instead of three Peltier thermoelectric modules, the single heat pump 134 comprises four Peltier thermoelectric modules 144. The temperature conditioned air from the main heat exchanger is passed to the seat back 12 and seat bottom 14 of the VTS by an air manifold 146 connected at one end to the outlet of the main heat exchanger 136 and at the other end to the seat back air inlet 24 and seat bottom air inlet 22. Alternatively, the third embodiment of the TCCS may comprise a double heat pump arrangement similar to that previously described in the first embodiment.

The third embodiment of the TCCS also differs from the first embodiment in that the main exchanger fan speed and the heat pump air temperature are not manually adjustable by the occupant. Rather, the fan speed and the air temperature are controlled automatically by the controller 64. Additionally, an occupant presence switch 148 is located within the VTS that is activated upon the presence of an occupant in the seat. The occupant presence switch may comprise a weight sensitive switch and the like located in the seat back or seat bottom. In a preferred embodiment, the occupant presence switch is located in the seat bottom and is electrically connected to the controller to relay the presence of an occupant. The use of a occupant presence switch to control the activation of the VTS is desired for purposes of conserving electricity when the VTS is not occupied and when it is not practical or desirable to give individual control over the seats, e.g., in bus passenger seating applications.

FIG. 7 is a flow chart illustrating a temperature climate control algorithm for the third embodiment of the TCCS as shown in FIG. 6. The activation of the main exchanger fan 138 is controlled by an occupant sitting in the VTS (step 150), which activates the occupant presence switch, and the ambient conditions inside the vehicle as transmitted to the controller by the ambient temperature sensors (step 148). To ensure a rapid temperature response upon placement of an occupant in the VTS, the controller pulses electrical power to the Peltier modules in the absence of an occupant at a steady state of voltage in the range of from 0.5 to 1 volt (step 152). The voltage that is actually applied during the duty cycle may be six or twelve volts. By maintaining a slow continuous pulse of power to the Peltier modules the transient time for achieving the desired temperature of conditioned air upon the presence of an occupant in the VTS is greatly minimized.

Once an occupant is seated in the VTS, the particular main fan speed and Peltier operating mode selected by the controller is dependent upon the ambient temperature surrounding the VTS occupant. When the ambient temperature is less than about 286° K. (step 154) the controller selects a heating mode of operation and passes 100 percent power to the Peltier modules and operates the main exchanger fan at medium speed (step 156). Upon the activation of the main exchanger fan the waste exchanger fan is also activated at high speed.

When the ambient temperature is between 286° K. and 290° K. (step 158) the controller selects a heating mode of operation and passes 75 percent power to the Peltier modules and operates the main exchanger fan at medium speed (step 160). When the temperature is between 290° K. and 293° K. (step 162) the controller selects a heating mode of operation and passes 25 percent power to the Peltier modules and operates the main exchanger fan at a medium speed (step 164).

When the ambient temperature is between 293° K. and 297° K. the (step 166) the controller pulses power to the Peltier modules at a steady state of approximately 0.5 volts and deactivates the main exchanger fan (step 168).

When the ambient temperature is between 297° K. and 297° K. (step 170) the controller selects a cooling mode of operation and passes 50 percent power to the Peltier modules and operates the main exchanger fan at medium speed (step 172). When the ambient temperature is between 300° K. and 302° K. (step 174) the controller selects a cooling mode of operation and passes 50 percent power to the Peltier modules and operates the main exchanger fan at high speed (step 176). When the ambient temperature is above 302° K. (step 178) the controller selects a cooling mode of operation and passes 100 percent power to the Peltier modules and operates the main exchanger fan at high sped (step 180).

In either the heating mode of operation (ambient temperatures up to 293° K.) or the cooling mode of operation (ambient temperatures above 297° K.), a Peltier modules temperature (step 182) below 200° K. or above 394° K. (step 184) causes the controller to deactivate the Peltier modules and maintain the operation of the main exchanger fan and waste exchanger fan (Step 186). Either of the above conditions indicate a system malfunction.

The third embodiment also includes a conditioned air temperature sensor 188 positioned in the air flow of the temperature conditioned air passing to the seat, as shown in FIG. 6. The conditioned air temperature sensor is electrically connected to the controller 64. The temperature climate control algorithm described above and illustrated in FIG. 7 is configured to deactivate the Peltier modules 144 in the event that the temperature of the conditioned air passing to the seat and to the occupant is greater than about 325° K. or below about 297° K. While the Peltier modules are deactivated the main exchanger fans continue to run.

The third embodiment of the TCCS as specifically described above and illustrated in FIG. 6 is used for controlling multiple VTSs in multi-occupant applications such as buses, trains, planes and the like. In such an application the main exchanger fan, waste exchanger fan, Peltier modules, temperature sensor, and weight sensitive switch from each VTS are electrically connected to a common controller. Multiple ambient air temperature sensors may be placed at different locations within the vehicle to provide an accurate temperature profile throughout the interior of the vehicle. The common controller is configured to accommodate inputs from the multiple ambient air temperature sensors. The common controller may be configured to control the main fan speed and mode of operation for the Peltier modules in the same manner as that specifically described above and illustrated in FIG. 7, taking into account the possibility of different ambient temperature zones within the vehicle surrounding each VTS.

Although limited embodiments of the temperature climate control system have been described and illustrated herein, many modifications and variations will be apparent to those skilled in the art. For example, it is to be understood within the scope of this invention that a temperature climate control system according to the present invention may comprise means for automatically adjusting the flow of temperature conditioned air from a single heat pump to the seat back or the seat bottom.

Figure 8:
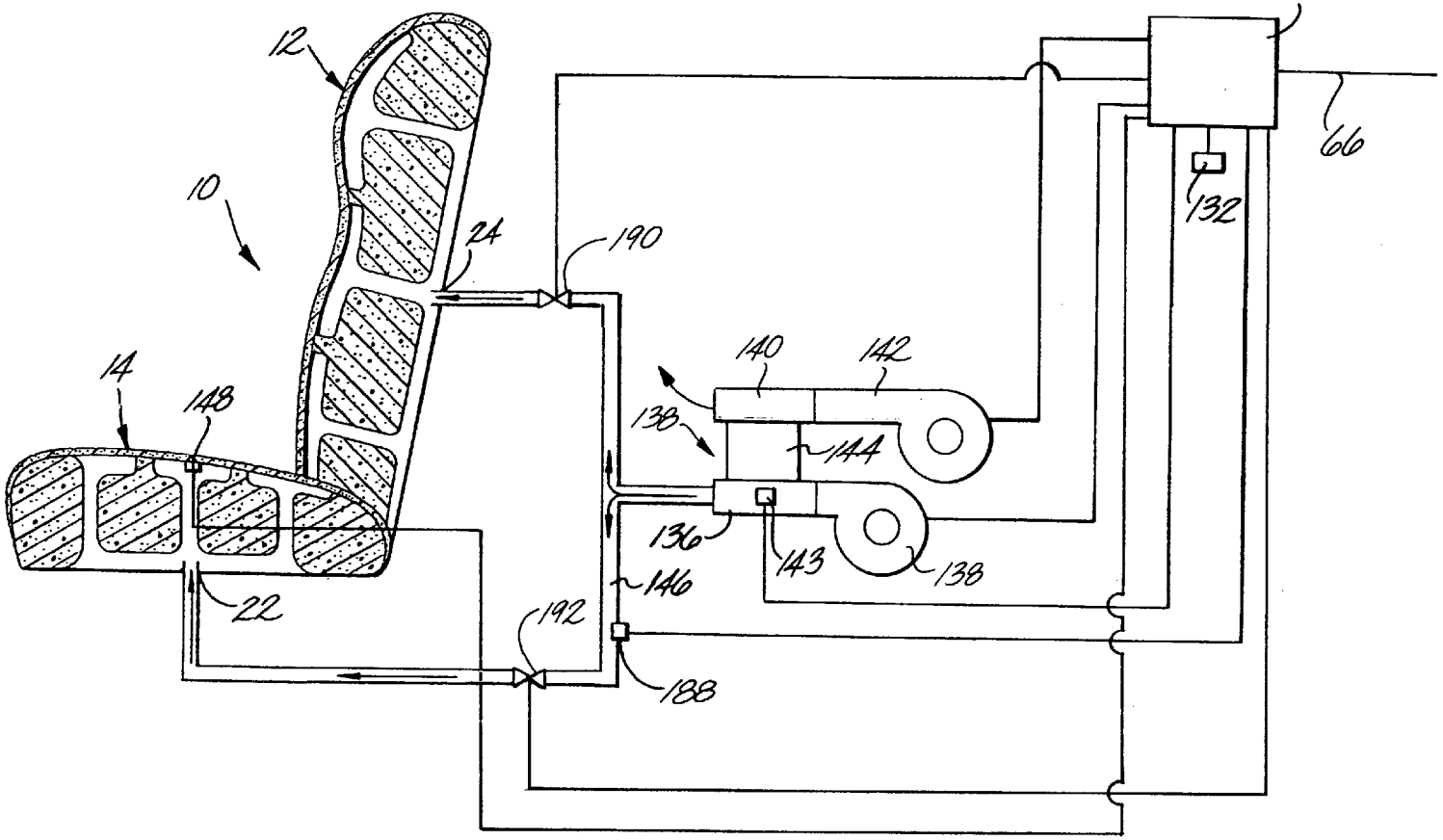
FIG. 8 is a schematic view of an alternative embodiment of the temperature climate control system according to the present invention.

FIG. 8 illustrates an alternative embodiment of the third embodiment of the TCCS, incorporating the use of valves 190 and 192 placed in the air manifold 146 leading to the seat back and the seat bottom, respectively. The valves are activated electrically by a controller 64 according to a predetermined control algorithm. The control algorithm may be the same as that specifically described above and illustrated in FIG. 7 for the third embodiment, with the addition that controller limits the flow of cooling air to the seat back by closing valve 190 in the event that the occupant receives too much cooling air over a period of time. This embodiment would help eliminate the occurrence of occupant discomfort after using the VTS.

In addition to the embodiments of the TCCS specifically described and illustrated, it is to be understood that such the TCCS may incorporate input from an energy management system, such as that used in electric powered vehicles. In specific embodiments, the TCCS is configured to accept an inhibit signal from such an energy management system. The inhibit signal is typically activated by a vehicle's energy management system under particular conditions of operation when an additional amount of energy is required or when the battery is being discharged to rapidly, such as during hard acceleration, when climbing a hill, or when the battery is weak or is approaching its minimum discharge voltage. The temperature climate control algorithm according to the present invention can be configured to deactivate the Peltier modules, the main exchanger fans, and the waste exchanger fans upon activation of the inhibit signal.

Accordingly, it is to be understood that, within the scope of the appended claims, the temperature climate control system according to principles of this invention may be embodied other than as specifically described herein.

What is claimed is:

1. A system for controlling the temperature climate in a variable temperature occupant seat comprising:

an occupant seat having means for distributing temperature conditioned air through the seat to increase a seat occupant's thermal comfort;

at least one heat pump connected to the seat by a[n air] conduit for providing temperature [conditioning] *conditioned* air to the seat[, the heat pump comprising:

at least one thermoelectric module for temperature conditioning the air];

at least one fan for passing the temperature conditioned air [through the seat to an occupant and for removing unwanted thermal energy from the thermoelectric module] *to the seat*;

a controller for activating and regulating the operation of the [thermoelectric module and] fan [of at least one heat pump] independent of occupant input after a desired mode of operation has been selected;

means for automatically operating the controller to [optimize] *change* system response, to provide [maximum] thermal comfort to the seated occupant, and to control cooling functions of the system to [minimize] *reduce* occupant discomfort and adverse physiological response; and an indicator switch attached to the seat to detect the presence of an occupant, the indicator switch being electrically connected to the controller.

2. The system as recited in claim 1, comprising a temperature sensor [attached to the heat pump to sense the operation of the heat pump, the temperature sensor being electrically connected to the controller to facilitate controlling the operation of the heat pump.] *with at least one of a sensor sensing the temperature of the heat pump, a sensor sensing the temperature of the seat, or a sensor sensing the ambient air temperature near the seat.*

3. The system as recited in claim [2]*1*, [comprising] *wherein the sensor comprises* at least one temperature sensor positioned in the flow path of the temperature conditioned [air] *fluid*.

4. The system as recited in claim 1, comprising more than one seat, the operation of each heat pump for each seat being automatically regulated by a single controller *capable of providing different comfort control to different seats*.

5. A method for controlling the temperature climate in a variable temperature occupant seat, the method comprising the steps of:

activating at least one thermoelectric module to provide temperature conditioned air [to be distributed through a variable temperature seat];

activating at least one electric fan for passing the temperature conditioned air [through means inside of] *to* the variable temperature seat;

sensing a system temperature and relaying the temperature information to a controller;

automatically adjusting the electrical power to the thermoelectric module when the thermoelectric module is operated in a cooling mode and when the temperature of the temperature conditioned air is below a minimum cooling temperature a predetermined amount of time after the cooling mode has been selected; and automatically activating each fan and each thermoelectric module by occupying the seat and automatically deactivating each fan and the thermoelectric module by vacating the seat.

6. The method as recited in claim 5, comprising manually adjusting the speed of each electric fan and mode of operation for each thermoelectric module to provide a desired flow rate and temperature of conditioned air directed to the occupant.

7. A method for controlling the temperature climate in a variable temperature occupant seat, the method comprising the steps of:

sensing whether the seat is occupied and relaying the information to a controller configured to automatically regulate the operation of one or more thermoelectric modules and fans;

activating at least one thermoelectric module in response to sensing occupancy of the seat to provide temperature conditioned air;

activating at least one fan [for passing] *to pass* the temperature conditioned air [through air channels inside of] *to* the variable temperature seat;

sensing a system temperature and relaying the temperature information to the controller; and automatically reducing electrical power to the thermoelectric modules when operated in a cooling mode after the temperature of the temperature conditioned air is below a minimum cooling temperature and after a maximum amount of time has passed since the system was placed in a cooling mode of operation.

8. The method as recited in claim 7, [further comprising the steps of reducing electrical power to the thermoelectric modules when operated in a cooling mode, the operating temperature is below a predetermined cooling temperature, a predetermined amount of time has passed since the temperature was last adjusted by the occupant, and the temperature of the conditioned air directed to an occupant is a cooler by a predetermined amount than the ambient temperature surrounding the occupant] *wherein the step of automatically changing the electrical power comprises the step of changing the power based on signals correlated to temperature and to elapsed time.*

9. A method for controlling the temperature climate in a variable controlled occupant seat, the method comprising the steps of:

activating a number of thermoelectric modules [for temperature conditioning air to be passed and distributed through a variable temperature seat] *to generate temperature conditioned air*;

[activating at least one fan for passing the temperature conditioned air through air channels inside of the variable temperature seat to an occupant] *communicating the temperature conditioned air to the occupant seat by at least one fan; and*;

sensing [the] *a control* temperature [of the thermoelectric modules] and relaying *information correlated to* the temperature [information] to a controller configured to automatically deactivate the operation of the thermoelectric modules and [fans] *the at least one fan* when the temperature [is below approximately 200° K. and above approximately 349° K.;

automatically decreasing the electrical power to the thermoelectric modules when the thermoelectric modules are operated in a cooling mode, the temperature is below approximately 303° K., and it has been more than 6 minutes since the operating mode was last adjusted by the occupant; and automatically decreasing the electrical power to the thermoelectric modules when the thermoelectric modules are operated in a heating mode and the temperature is in the range of from 339° K. to 349° K] *reaches a predetermined limit for a predetermined time to prevent damage to one of the occupant seat or a seat occupant.*

10. The method as recited in claim 9, [comprising sensing] *wherein the control temperature comprises at least one*

*of* the temperature of the conditioned air directed to the occupant and the temperature of the ambient air surrounding the occupant [and relaying the temperature information to the controller].

11. The method as recited in claim 10, comprising automatically [decreasing] *changing* the electrical power to the thermoelectric modules when the thermoelectric modules are operated in a cooling mode, the temperature is below approximately 303° K., it has been more than 6 minutes since a the operating mode was last adjusted by the occupant[, and the temperature of the conditioned air is more than 3° K. less than the temperature of the ambient air].

12. A system for controlling the temperature climate in a variable temperature occupant seat comprising:

an occupant seat having [means] *at least one conduit configured* to distribute *a sufficient amount of* temperature conditioned air through the seat [and the temperature conditioned air through the seat for the purpose of increasing] *to increase* a seat occupant's thermal comfort;

at least one heat pump for providing temperature conditioned air, each heat pump being [connected to] *in fluid communication with the conduit in* the seat [by an air conduit] and including one or more fan*s* and one or more thermoelectric module*s*;

a controller [for activating and regulating the operation of each] *in electrical communication with the* heat pump [to produce] *and fan and controlled to provide* temperature conditioned air [at a temperature and fan speed to maximize] *to increase* the thermal comfort of [the] *a* seated occupant;

at least one [temperature] sensor for monitoring the operation of at least one heat pump, [the temperature sensor being electrically connected to the controller] *or monitoring the temperature of the air passing through the heat pump, or monitoring ambient air temperature and providing a signal correlated to that operation or monitored temperature to the controller*;

means for automatically operating the controller to [optimize system response, to] provide [maximum] thermal comfort to the seated occupant, and to control heating and cooling functions of the system to [minimize] *reduce* occupant discomfort and adverse physiological response; and an indicator for detecting the presence of the seat occupant, the indicator being electrically connected to the controller.

13. A system for controlling the temperature climate in a variable temperature occupant seat comprising:

an occupant seat having [means] *at least one distribution conduit configured* to distribute temperature conditioned air through the seat [and the temperature conditioned air through the seat for the purpose of increasing] *to increase* a seat occupant's thermal comfort;

at least one heat pump for providing temperature conditioned air *from the heat pump to the distribution conduit*, each heat pump [being connected to the seat by an air conduit and] including one or more fan*s* and one or more thermoelectric module*s*;

a controller for activating and regulating the operation of each heat pump to produce temperature conditioned air at a temperature and fan speed to [maximize] *adjust* the thermal comfort of the seated occupant;

at least one temperature sensor [for monitoring the operation of at least one heat pump, the temperature sensor being] electrically connected to the controller; and means for automatically operating the controller to [optimize] *vary the* system response, to provide [maximum] thermal comfort to the seated occupant, and to control heating and cooling functions of the system, to [minimize] *reduce* occupant discomfort and adverse physiological response, wherein the means for automatically operating the controller reduces the cooling functions of the system when the temperature of the temperature conditioned air is below a minimum cooling temperature and after a maximum amount of time has passed since the system was placed in a cooling mode of operation.

14. The system as recited in claim 13, wherein the [reduction in cooling functions] *variation in temperature conditioned air* is achieved by [reducing power] *changing voltage* to the thermoelectric module.

15. The system as recited in claim 13, wherein the [reduction in cooling functions] *variation in temperature conditioned air* is achieved by [reducing] changing power to *at least one of* the thermoelectric module and [to] the fan.

16. A system for controlling the temperature climate in a variable temperature occupant seat comprising:

an occupant seat having means for distributing temperature conditioned air through the seat to increase a seat occupant's thermal comfort;

at least one heat pump [connected to the seat by an air conduit for] providing temperature conditioning air to the seat[, each heat pump comprising:]*;*

[at least one thermoelectric module for temperature conditioning the air;]

at least one fan [for passing] *positioned to move* the temperature conditioned air through the [seat to an occupant and for removing unwanted thermal energy from the thermoelectric module] *conduit*;

a controller for activating and regulating the operation of the [thermoelectric module and fans of each] heat pump independent of occupant input after a desired mode of operation has been selected;

means for automatically operating the controller to optimize system response, to provide maximum thermal comfort to the seated occupant, and to control *heating and* cooling functions of the system, to [minimize] *reduce* occupant discomfort and adverse physiological response, wherein the means for automatically operating the controller reduces the cooling functions of the system when the temperature of the temperature conditioned air is below a minimum cooling temperature and after a maximum amount of time has passed since the system was placed in a cooling mode of operation.

17. A system for controlling the temperature climate in a variable temperature occupant seat comprising:

an occupant seat comprising a seat bottom and a seat back portion each having [means for distributing] *an air distribution conduit sized and located to distribute* temperature conditioned air through the seat and direct[ing] it to an occupant;

a seat back heat pump for conditioning the temperature of the air and passing the air through an air conduit to the seat back[, the seat back heat pump comprising a main exchanger fan and at least one thermoelectric module];

a seat bottom heat pump for conditioning the temperature of the air and passing the air through an air conduit to the seat bottom[, the seat bottom heat pump comprising a main exchanger fan and at least one thermoelectric module];

*at least one fan arranged to move air from at least one of the heat pumps through the air conduit associated with the respective heat pump;*

[a] *at least one* temperature sensor positioned [in each heat pump] *to monitor the temperature of at least one of the ambient air, conditioned air from at least one heat pump, or at least one heat pump*;

a controller [for automatically activating and regulating the speed of the main fans, and automatically selecting the mode of operation for the thermoelectric module in each heat pump] *receiving information from the temperature sensor and configured to automatically activate and regulate at least one of the speed of the fans and the temperature of the air conditioned by at least one of the heat pumps*;

means for automatically operating the controller to optimize system response, to provide maximum thermal comfort to the seated occupant, and to control cooling functions of the system to minimize occupant discomfort and adverse physiological response, wherein the means for automatically operating the controller reduces the cooling functions of the system when the temperature of the temperature conditioned air is below a minimum cooling temperature and after a maximum amount of time has passed since the system was placed in a cooling mode of operation.

18. A system for controlling the temperature climate in a variable temperature occupant seat comprising:

an occupant seat comprising a seat bottom and a seat back portion each having [means for distributing] *a system configured and located to distribute* temperature conditioned air [through] *in* the seat [and directing it to an occupant];

a seat back heat pump [for conditioning the temperature of the air and passing the air through an air conduit to the seat back, the seat back heat pump comprising a main exchanger fan and at least one thermoelectric module] *in fluid communication with a fan arranged to pass temperature conditioned air to the system*;

[a] *at least one* seat bottom heat pump [for conditioning the temperature of the air and passing the air through an air conduit to the seat bottom, the seat bottom heat pump comprising a main exchanger fan and at least one thermoelectric module] *in fluid communication with a fan arranged to pass temperature conditioned air to the system*;

[a] *at least one* temperature sensor positioned [in each heat pump] *to monitor the temperature of at least one of the seat bottom, seat back, ambient air, conditioned air from at least one heat pump, and at least one heat pump*;

a controller [for automatically activating and regulating the speed of the main fans, and automatically selecting the mode of operation for the thermoelectric module in each heat pump] *receiving information from the temperature sensor and configured to automatically activate and regulate at least one of the speed of the fans and the temperature of the air conditioned by at least one of the heat pumps*;

means for automatically operating the controller to optimize system response, to provide maximum thermal comfort to the seated occupant, and to control cooling functions of the system to minimize occupant discomfort and adverse physiological response; and an indicator for detecting the present of an occupant, the indicator being electrically connected to the [automatic operating means] *controller*.

*19. A system as defined in claim 16, wherein the time and power to the controller vary with a temperature signal from the least one temperature sensor.*

*20. A system as defined in claim 17, wherein the time and power to the controller vary with a temperature signal from the least one temperature sensor.*

*21. A system as defined in claim 9, further comprising the step of automatically changing the electrical power to the thermoelectric modules when the control temperature reaches a predetermined temperature and/or when a predetermined amount of time has passed.*

*22. A system for controlling the temperature climate in a variable temperature occupant seat comprising:*

*an occupant seat having a conduit to distribute temperature conditioned heating or cooling medium to an area of a seat;*

*at least one heat pump connected to the seat by a conduit for providing a temperature conditioning medium to the conduit in the seat;*

*at least one fan for passing the temperature conditioned air to the conduit in the seat;*

*a controller for activating and regulating the operation of the fan independent of occupant input after a desired mode of operation has been selected;*

*means for automatically operating the controller to change system response, to provide thermal comfort to the seated occupant, and to control cooling functions of the system to reduce occupant discomfort and adverse physiological response; and*

*an indicator switch located within the seat to detect the presence of an occupant, the indicator switch being electrically connected to the controller.*

*23. A method for controlling the temperature climate in a variable temperature occupant seat, the method comprising the steps of:*

*activating at least one thermoelectric module to provide temperature conditioned air;*

*activating at least one electric fan for passing the temperature conditioned air to the variable temperature seat;*

*sensing a system temperature and relating the temperature information to a controller;*

*automatically adjusting the electrical power to the thermoelectric module based upon temperature and elapsed time information to adjust the temperature of the air distributed to the occupant seat; and*

*automatically activating each fan and each thermoelectric module by occupying the seat and activating a weight-sensitive sensor and automatically deactivating each fan and the thermoelectric module by vacating the seat and deactivating a weight-sensitive sensor.*

*24. A method for controlling the temperature climate in a variable temperature occupant seat, the method comprising the steps of:*

*sensing whether the seat is occupied by use of a weight-sensitive sensor and relaying the information to a controller configured to automatically regulate the operation of one or more thermoelectric modules and fans;*

*activating at least one thermoelectric module in response to sensing the status of the weight-sensitive sensor to provide temperature conditioned air;*

*activating at least one fan to pass the temperature conditioned air to the variable temperature seat;*

*sensing a temperature and relaying the temperature information to the controller; and*

*automatically changing electrical power to the thermoelectric modules, by varying a duty cycle of power to*

*the modules, when operated in a cooling mode after the temperature of the temperature conditioned air is below a minimum cooling temperature and after a maximum amount of time has passed since the system was placed in a cooling mode of operation.*

*25. A system for controlling the temperature climate in a variable temperature occupant seat comprising:*

*an occupant seat having at least one conduit configured to distribute a sufficient amount of temperature conditioned air through the seat to increase a seat occupant's thermal comfort;*

*at least one heat pump for providing temperature conditioned air, each heat pump being in fluid communication with the conduit in the seat and having a fan to move thermally conditioned air to the conduit in the seat;*

*a controller in electrical communication with the heat pump and fan and controlled to provide temperature conditioned air to increase the thermal comfort of a seated occupant;*

*at least one sensor for monitoring the operation of at least one heat pump, or monitoring the temperature of the air passing through the heat pump, or monitoring ambient air temperature and providing a signal correlated to that operation or monitored temperature to the controller;*

*means for automatically operating the controller to provide thermal comfort to the seated occupant, and to control heating and cooling functions of the system to reduce occupant discomfort and adverse physiological response; and*

*an indicator located in the seat for detecting the presence of the seat occupant, the indicator being in communication with the controller.*

* * * * *

UNITED STATES PATENT AND TRADEMARK OFFICE

CERTIFICATE OF CORRECTION

PATENT NO. : RE 38,128 E 
DATED : June 3, 2003
INVENTOR(S) : David F. Gallup, David R. Noles and Richard R. Willis It is certified that error appears in the above-identified patent and that said Letters Patent is hereby corrected as shown below:

Column 14,
Line 46, please replace “one fan; and;” with -- one fan; and --

Column 15,
Line 7, please replace “thermoelectric modules” (second instance) with
-- a the operation --

Column 17,
Line 62, please replace “detecting the present” with -- detecting the presence --

Signed and Sealed this

Thirteenth Day of July, 2004

JON W. DUDAS
*Acting Director of the United States Patent and Trademark Office*